US010218210B2

United States Patent
Yang et al.

(10) Patent No.: US 10,218,210 B2
(45) Date of Patent: Feb. 26, 2019

(54) ADAPTIVE IMPEDANCE CONTROL FOR WIRELESS CHARGING

(71) Applicant: INTEL CORPORATION, Santa Clara, CA (US)

(72) Inventors: Songnan Yang, San Jose, CA (US); Bin Xiao, San Ramon, CA (US); Essam Elkhouly, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 15/280,846

(22) Filed: Sep. 29, 2016

(65) Prior Publication Data

US 2018/0090969 A1    Mar. 29, 2018

(51) Int. Cl.
*H02J 7/00* (2006.01)
*H02J 7/02* (2016.01)
*H02J 50/12* (2016.01)

(52) U.S. Cl.
CPC .............. *H02J 7/025* (2013.01); *H02J 50/12* (2016.02)

(58) Field of Classification Search
USPC .................. 320/107, 108, 109, 110, 112, 119
See application file for complete search history.

(56) References Cited

U.S. PATENT DOCUMENTS

| 2009/0174496 A1* | 7/2009 | Van Bezooijen ......... H03F 1/56 333/17.3 |
| 2013/0099807 A1* | 4/2013 | Wheeland ............... H02J 17/00 324/713 |
| 2014/0197905 A1* | 7/2014 | Tsuzuki ............... H03H 7/0153 333/174 |
| 2015/0051750 A1 | 2/2015 | Kurs et al. |
| 2017/0093170 A1* | 3/2017 | Saunamaki ............. H02J 5/005 |
| 2017/0187355 A1* | 6/2017 | Yang ......................... H03J 7/04 |

FOREIGN PATENT DOCUMENTS

| WO | 2013067484 A1 | 5/2013 |
| WO | 2014152103 A1 | 9/2014 |
| WO | 2015094666 A1 | 6/2015 |

OTHER PUBLICATIONS

PCT International Search Report, PCT Application No. PCT/US2017/048613, dated Dec. 5, 2017, 3 pages.

* cited by examiner

*Primary Examiner* — Brian Ngo
(74) *Attorney, Agent, or Firm* — International IP Law Group, P.L.L.C.

(57) ABSTRACT

An apparatus is described. The apparatus includes a transmission coil and a power amplifier. The power amplifier includes a microcontroller and a memory. The memory includes instructions to determine electric current output of the power amplifier, perform a lookup of load reactance range based on target electric current, detect load impedance, calculate reactance based on the load impedance, determine if reactance is within the load reactance range, and adjust reactance shift compensation to bring the reactance within the load reactance range if the reactance is not within the load reactance range.

21 Claims, 9 Drawing Sheets

ADAPTIVE IMPEDANCE CONTROL FOR WIRELESS CHARGING

TECHNICAL FIELD

This disclosure relates generally to techniques for wireless charging. Specifically, this disclosure relates to adaptively tuning a wireless power transmitter.

BACKGROUND

Wireless charging is the use of magnetic resonance techniques to provide power to electronic devices without wires. Magnetic resonance based wireless charging may employ a magnetic coupling between a transmit (Tx) coil and a receiver (Rx) coil. The Tx and Rx coils are included in a wireless power transmitter unit (PTU), and a wireless power receiving unit (PRU), respectively.

Efficiency is a challenge for magnetic-resonance-based wireless charging solutions, such as A4WP. The efficiency rating is measured as a ratio of the amount of direct current (DC) power received at the wireless charging PRU divided by the amount of alternating current (AC) power input to the wireless charging PTU. Current wireless charging solutions for personal computer exhibit a lower efficiency rating than charging via wired electricity, i.e., from an AC outlet in a home or office.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The present disclosure relates generally to techniques for wireless charging. Specifically, the techniques described herein provide a wireless PTU having a Tx coil configured to generate a magnetic field. The PTU includes a power amplifier that automatically impedance matches its output to the input of the transmit coil. The power amplifier of the claimed subject matter is responsive to a change in the impedance of the transmit coil, such as, a change in the reactance of the transmit coil.

In some cases, the techniques discussed herein may be implemented using a wireless charging standard protocol, such as the specification provided by Alliance For Wireless Power (A4WP) version 1.3, Nov. 5, 2014. However, the techniques described herein may be implemented using any other wireless charging standard protocol where applicable.

Conventional A4WP wireless charging systems typically consist of at least four power conversion, or power transfer, stages. These stages are the AC to DC conversion in a power adaptor, the DC to DC conversion, the DC to radio frequency (RF) conversion in a power amplifier, the coil to coil transfer in Tx and Rx coils, and the RF to DC conversion in a rectifier. These power conversion and transfer stages are performed at a relatively high frequency, e.g., 6.78 megahertz (MHz). However, within the AC power adapter, the same 4 stages are repeated at a lower frequency, e.g., 300 kHz: an AC to DC conversion in a rectifier, DC/AC inverter, Coil/Coil transformer, and AC/DC rectifier. Accordingly, the same series of power conversion is repeated: once at hundreds of kHz in the power adaptor and another time at 6.78 MHz in the wireless power transfer system, thus totaling eight stages. This repetition is inefficient.

Accordingly, the efficiency of wireless charging has been improved by consolidating the eight conversion stages into four conversion stages. This is accomplished by performing the DC to RF conversion at the higher frequency, e.g., 6.78 MHz with line voltage e.g., 150-300 volts as input. This new topology requires new scheme of output current control through phase shifting between two phase legs of the inverter. Such scheme introduces new challenges in optimizing power amplifier efficiency over a range of output currents, where the conventional architecture of fixed target adaptive impedance tuning is not adequate. In examples of the claimed subject matter, a dynamic, output-current-dependent adaptive impedance tuning target is used to improve the efficiency of the power transfer for a range of output current levels.

In the following description, numerous specific details are set forth, such as examples of specific types of system configurations, specific hardware structures, specific architectural details, in order to provide a thorough understanding of the present invention. It will be apparent, however, to one skilled in the art that these specific details need not be employed to practice the present invention. In other instances, well known components or methods, such as specific and alternative processor architectures, specific logic circuits or code for described algorithms, specific firmware code, specific interconnect operation, specific logic configurations, specific manufacturing techniques and materials, specific compiler implementations, specific expression of algorithms in code, specific power down and gating techniques or logic and other specific operational details of computer system have not been described in detail in order to avoid unnecessarily obscuring the present invention.

Figure 1:
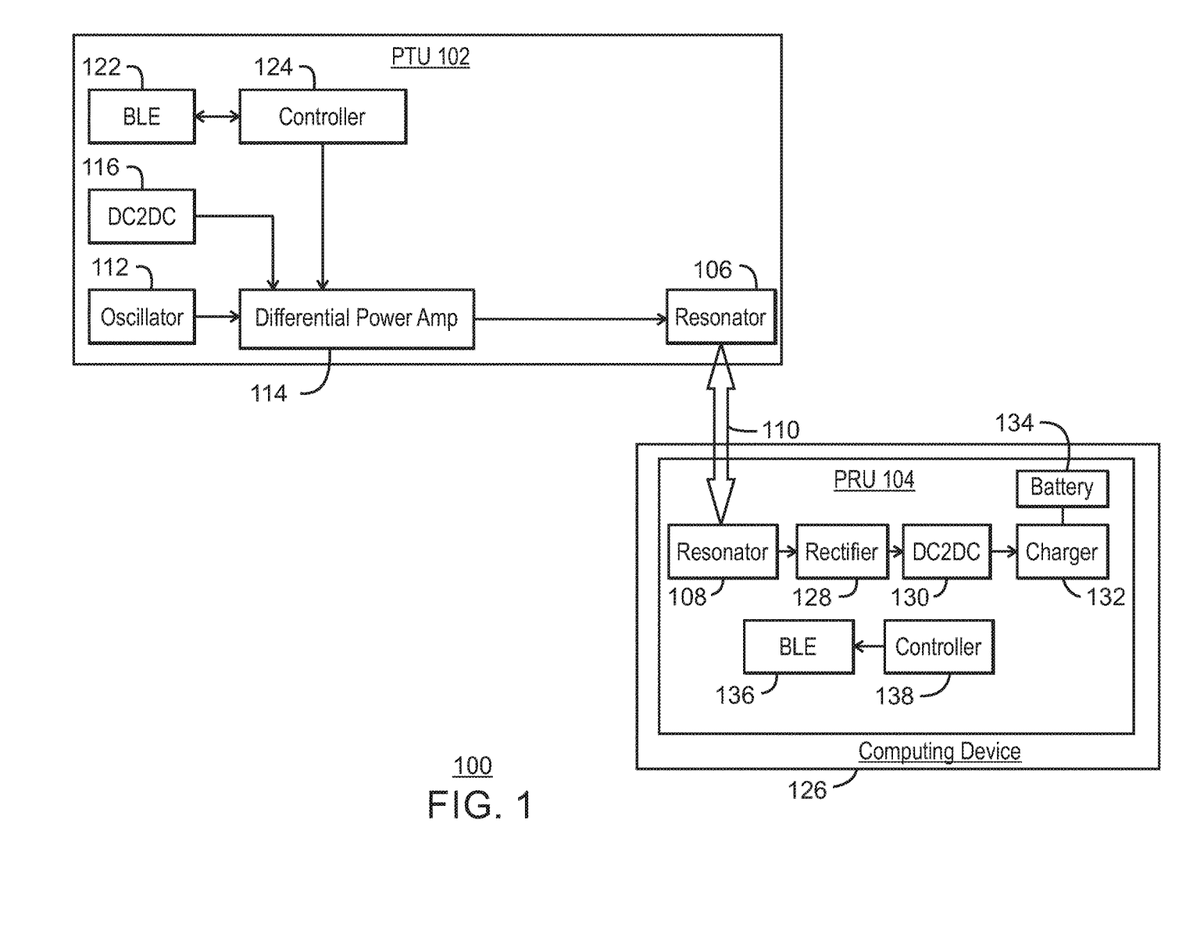
FIG. 1 is a block diagram of a system for wireless charging.

FIG. 1 is block diagram of a system 100 for wireless charging. The system 100 includes a PTU 102 and a PRU 104. The PTU 102 may include a resonator 106, an oscillator 112, a differential power amplifier (PA) 114, and a DC2DC converter 116. The PRU 104 also includes a resonator 108. The PTU 102 may be coupled to the PRU 104 via magnetic inductive between the resonators 106 and 108, as indicated by arrow 110. The resonator 106 of the PTU 102 is also referred to herein as a Tx coil 106. The resonator 108 of the PRU 104 is also referred to herein as an Rx coil 108.

The oscillator 112 generates a periodic oscillating electronic signal at a specified frequency. The differential power amplifier 114 receives direct current power from the DC2DC converter 116, and amplifies the signal received from the oscillator 112. The differential power amplifier 114 may be a differential class power amplifier, such as a Class D differential power amplifier, described in greater detail below. In examples of the claimed subject matter, the differential power amplifier 114 automatically matches its impedance to the impedance of the resonator 106 in order to perform efficient power transmission for the current level output by the differential power amplifier 114. The differential power amplifier 114 may include any suitable arrangement of electrical components such as capacitors, inductors, and other circuit elements that can be adjusted to impedance match the resonator 106 to the differential power amplifier 114, as described further below.

Other components of the PTU may include a Bluetooth Low Energy (BLE) module 122, a controller 124, and others. The controller 124 can be configured to control various aspects of the operation of the PTU 102. For example, the controller 124 can set a frequency, and power level of the power radiated by the resonator 106. The controller 124 can also control communications between the PTU 102 and the PRU 104 through the BLE module 122.

The PRU 104 may be a component of a computing device 126 configured to receive power from the PTU 102 wirelessly by the inductive coupling 110. The computing device 126 may be any suitable type of computing device, including a laptop computer, an Ultrabook, a tablet computer, a phablet, a mobile phone, smart phone, smart watch, and other types of mobile battery-powered devices.

The PRU 104 can include a rectifier 128, a DC2DC converter 130, a battery charger 132, and a battery 134. The computing device 126 receives electrical power as a magnetic flux associated with the inductive coupling that passes through the resonator 108. The rectifier 128 receives an alternating current voltage from the resonator 108 and generates a rectified direct current voltage (Vrect). The DC2DC converter 130 receives the rectified voltage from the rectifier 128, converts the voltage to a suitable voltage level, and provides the output to the battery charger 132, which charges the battery 134. The battery 134 powers the various platform hardware of the computing device 126. The platform hardware includes all of the processors, working memory, data storage devices, communication buses, I/O interfaces, communication devices, display devices, and other components that make up the computing device 126.

The PRU 104 may also include a Bluetooth Low Energy (BLE) module 136 and a controller 138. The controller 138 performs a wireless handshake with the PTU 102. As discussed above, a wireless handshake broadcast may be performed through the BLE modules 122 and 136, or other wireless data transmission component. Various types of information may be transmitted during the wireless handshake, including power budget, wireless charging capabilities, size of the computing device 126, and other information.

The differential power amplifier 114 may sense a reactance shift of the resonator 106 occurring due to inductive coupling between the PTU 102 and other objects, such as metallic objects, ferrite material or even the PRU 104. Upon detection of a reactance shift outside of predefined range of values, the differential power amplifier may retune the TX resonator 106 to present a desirable impedance to the PA at the operating frequency.

The block diagram of FIG. 1 is not intended to indicate that the PTU 102 and the PRU 104 are to include all of the components shown in FIG. 1. Further, the PTU 102 and the PRU 104 may include any number of additional components not shown in FIG. 1, depending on the details of the specific implementation.

Conventionally, output current control is achieved by adjusting the DC voltage supplied to the differential power amplifier 114 through the DC2DC converter 116. However, to improve the efficiency of wireless charging systems, the DC bus voltage is fixed. Thus, in order to provide adjustable RF current to the Tx coil 106, a phase shift Class D architecture may be used to adjust the output current level by modifying the phase between the two legs of the differential Class D power amplifier.

Figure 2:
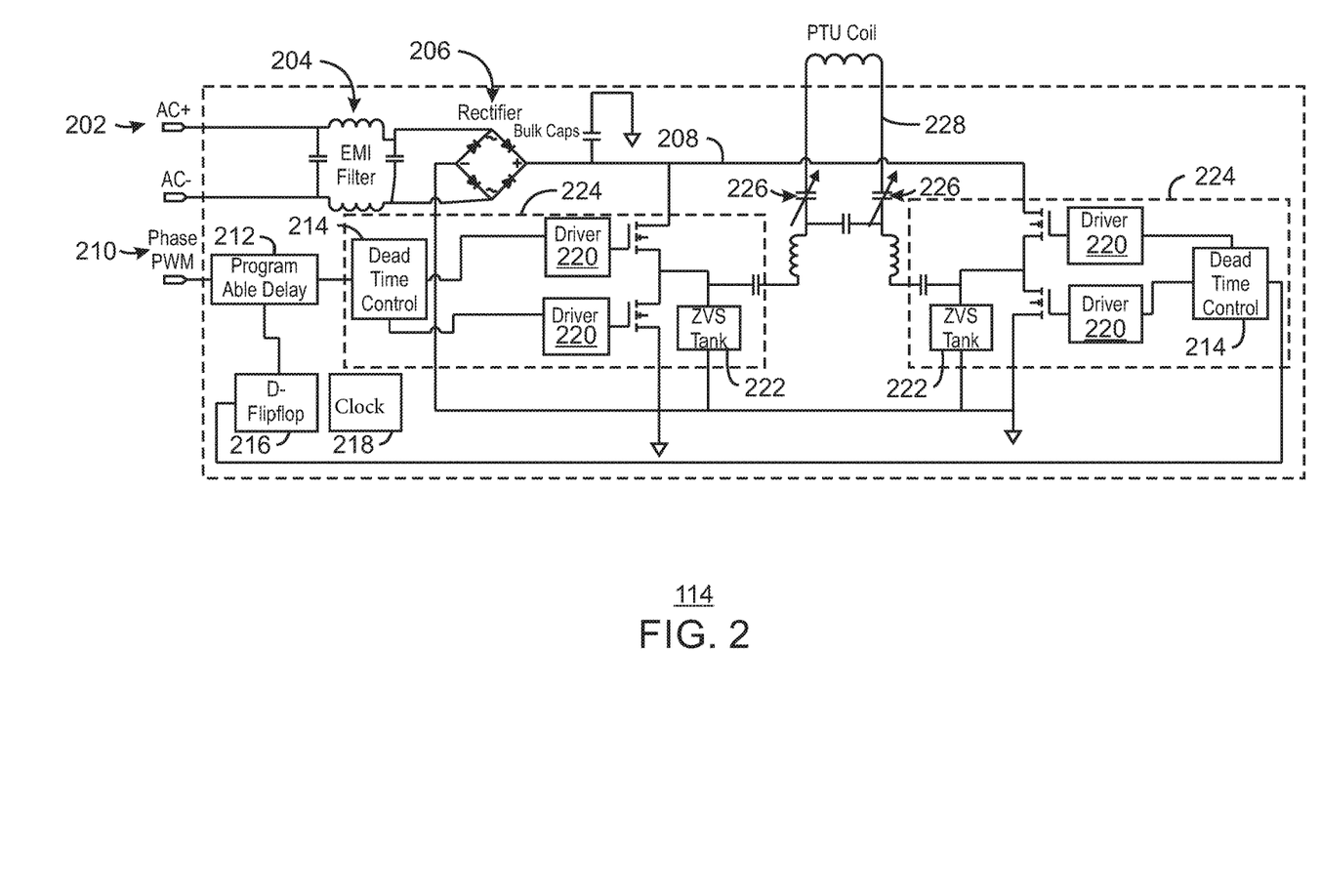
FIG. 2 is a block diagram of a differential power amplifier and a transmission coil.

FIG. 2 is a schematic of the differential power amplifier 114 with adaptive impedance control for wireless charging. The differential power amplifier 114 includes AC voltage inputs 202, an electromagnetic interference (EMI) filter 204, a rectifier 206, which outputs DC Vbus 208, phase pulse width modulator (PWM) input 210, a programmable delay circuit 212, dead time controls 214, a D-flipflop circuit 216, clock circuit 218, driver circuits 220, zero voltage switching (ZVS) tank circuits 222, class D phase legs 224, capacitors 226, and a PTU coil 228.

The EMI filter 204 removes electromagnetic interference from the power amplifier circuit and prevent it from getting back into the AC inputs 202. The rectifier 206 converts the AC voltage to DC voltage, which is directly applied to the switching transistors on the DC Vbus 208. The phase PWM input 210 provides a modulated signal to control the amount of power supplied to the PTU coil 228. The dead time controls 214 are used to tune the circuit to operate in ZVS mode for most of the time. The D-flipflop circuit 216 is used to take the clock input and generate two 180 degrees out of phase clock signal to drive two phase legs (224) of the amplifier. The clock circuit 218 is a clock generator, which generate clock frequency at twice the operating frequency to supply to the D-flipflop circuit. For example, the clock circuit 218 may generate clock at 13.56 MHz. The driver circuits 220 drive the main switching transistors. Further, the ZVS tank circuits 222 are also employed to make sure that the PA operates under ZVS condition.

In order to provide different output currents to the PTU coil 228, the phase of the gate drive signals for the two class D amplifier phase legs 224 is controlled by the programmable delay circuit 212. Achieving current control in this way introduces challenges in making the differential power amplifier 114 efficient over a range of output currents. One way to make the power amplifier efficient is to use fixed target adaptive impedance tuning. However, in wireless charging systems with fixed DC bus voltage, fixed target adaptive impedance tuning is not effective. Accordingly, in examples of the claimed subject matter, an output-current-dependent, adaptive impedance tuning is used to improve efficiency across various output current conditions in a wireless charging PTU 102.

The capacitors 226 retune the transmit coil 228 to desirable impedance presented to the PA at resonant frequency. In one example, the capacitors 226 generate a reactance shift to counter a detected reactance shift. As the reactance shifts, additional capacitors 226 can be engaged to counter the shift. In some situations, reactance shifts may occur rapidly in comparison to a phase delay. The capacitors 226 are able to respond to such rapid shifts.

The PTU 102 architecture provides efficiency improvement over the conventional 8-stage power conversion solutions. Further, the programmable delay 212 and the adaptive reactance table enables the differential power amplifier 114 to operate at a load reactance condition that provides efficient power amplification at various levels of current output. In contrast, the fixed adaptive tuning target provides a challenge in balancing the tuning target to achieve consistently good power amplifier efficiency as the phase shift varies.

Figure 3:
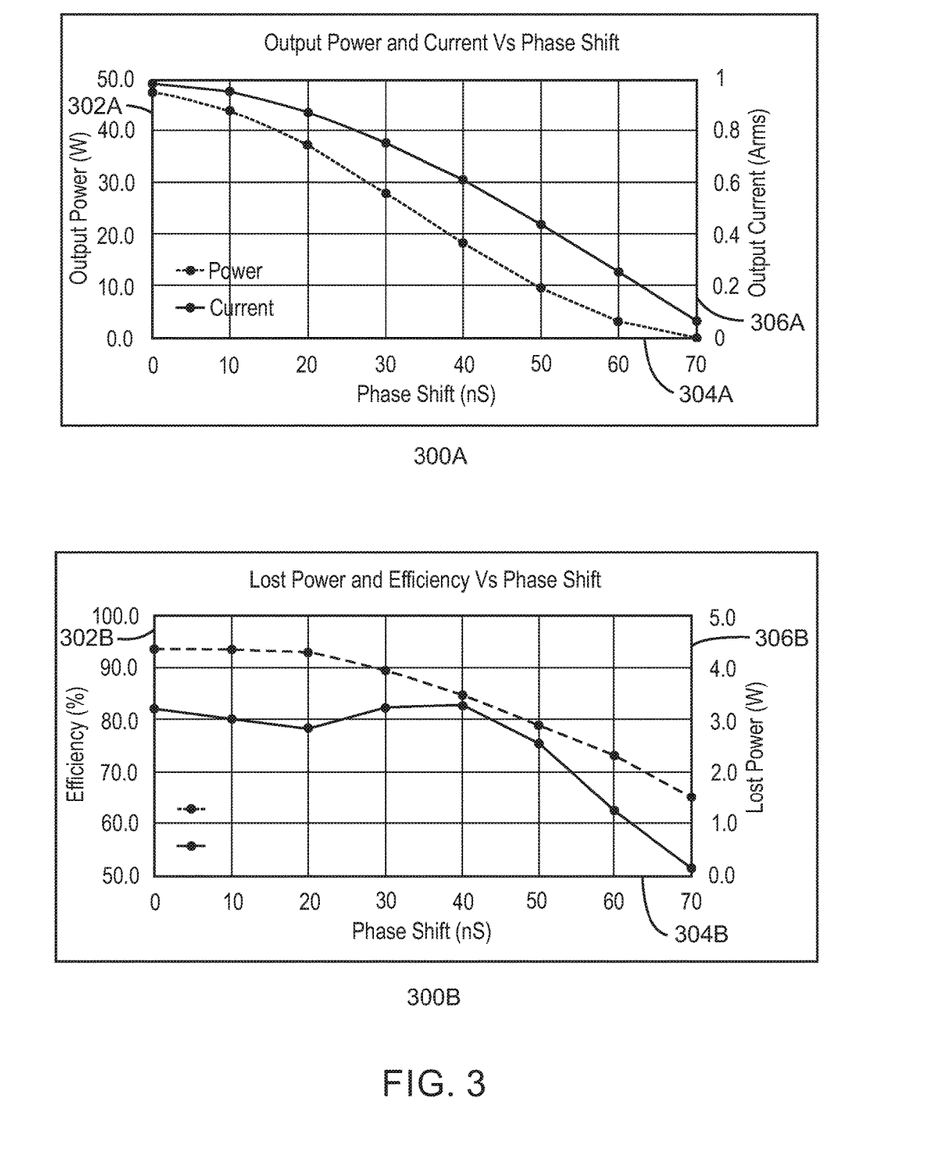
FIG. 3 shows charts of efficiency for current versus phase shift for a wireless charging system.
Figure 4A:
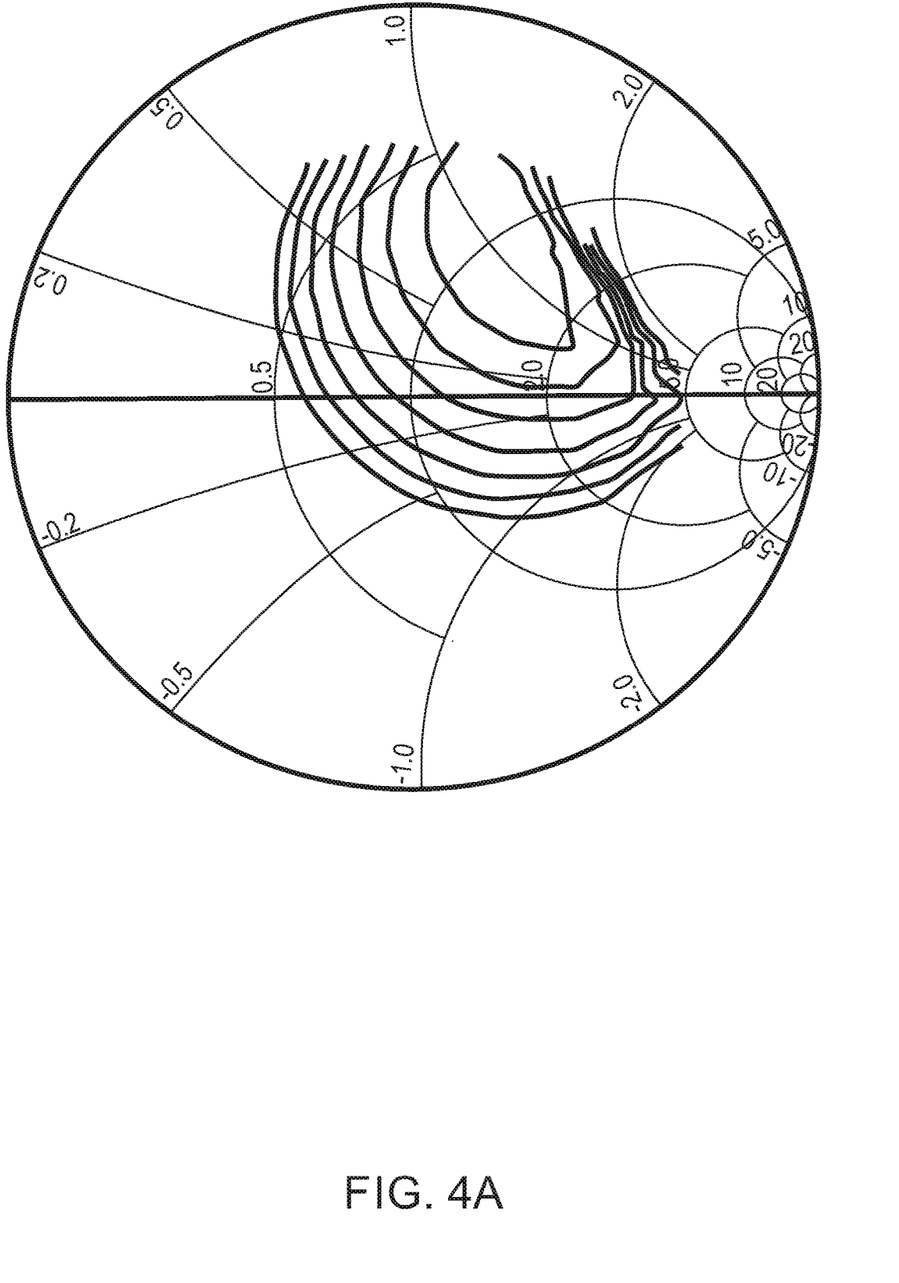
FIGS. 4A-4D are diagrams of impedance for different phase shifts.
Figure 4B:
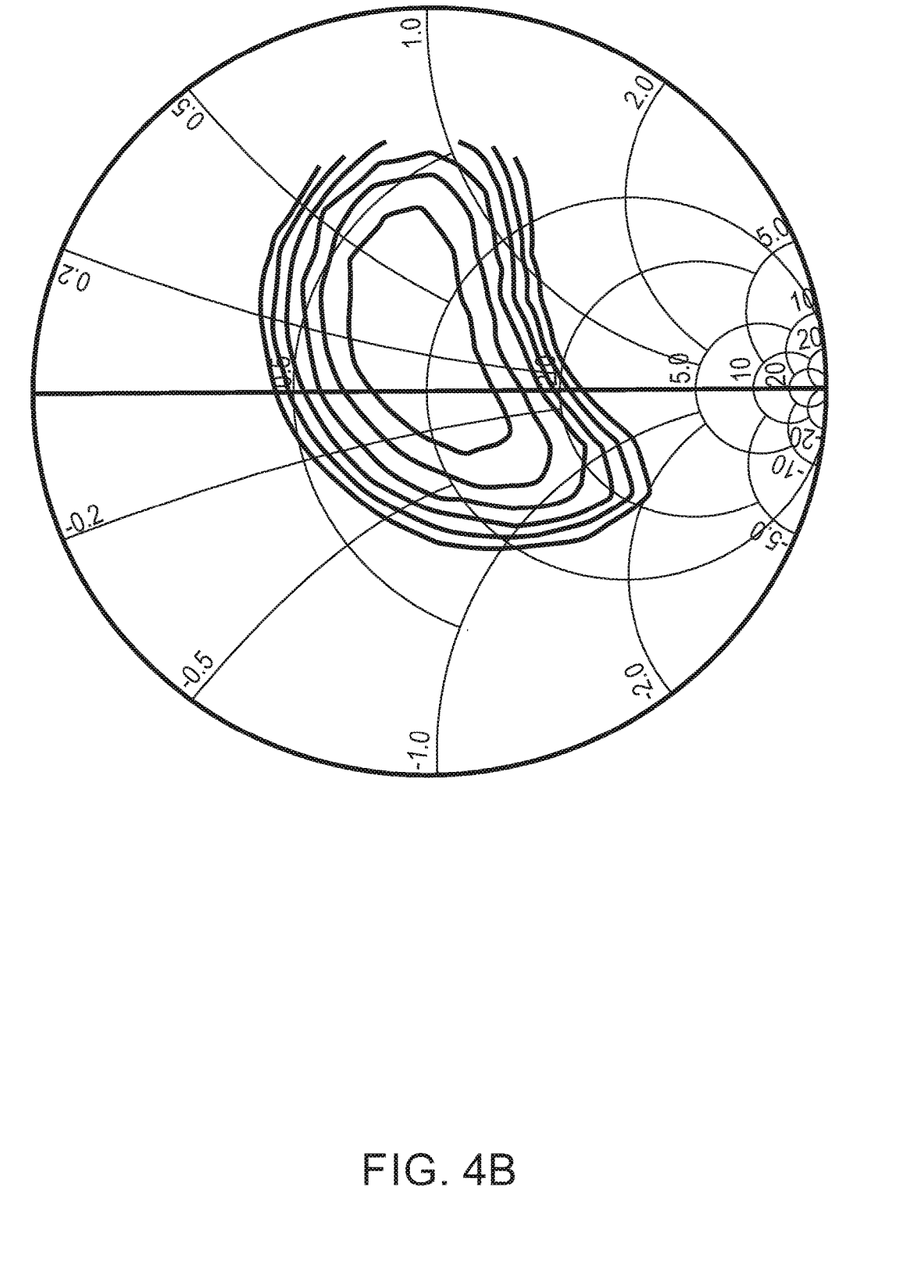
Figure 4C:
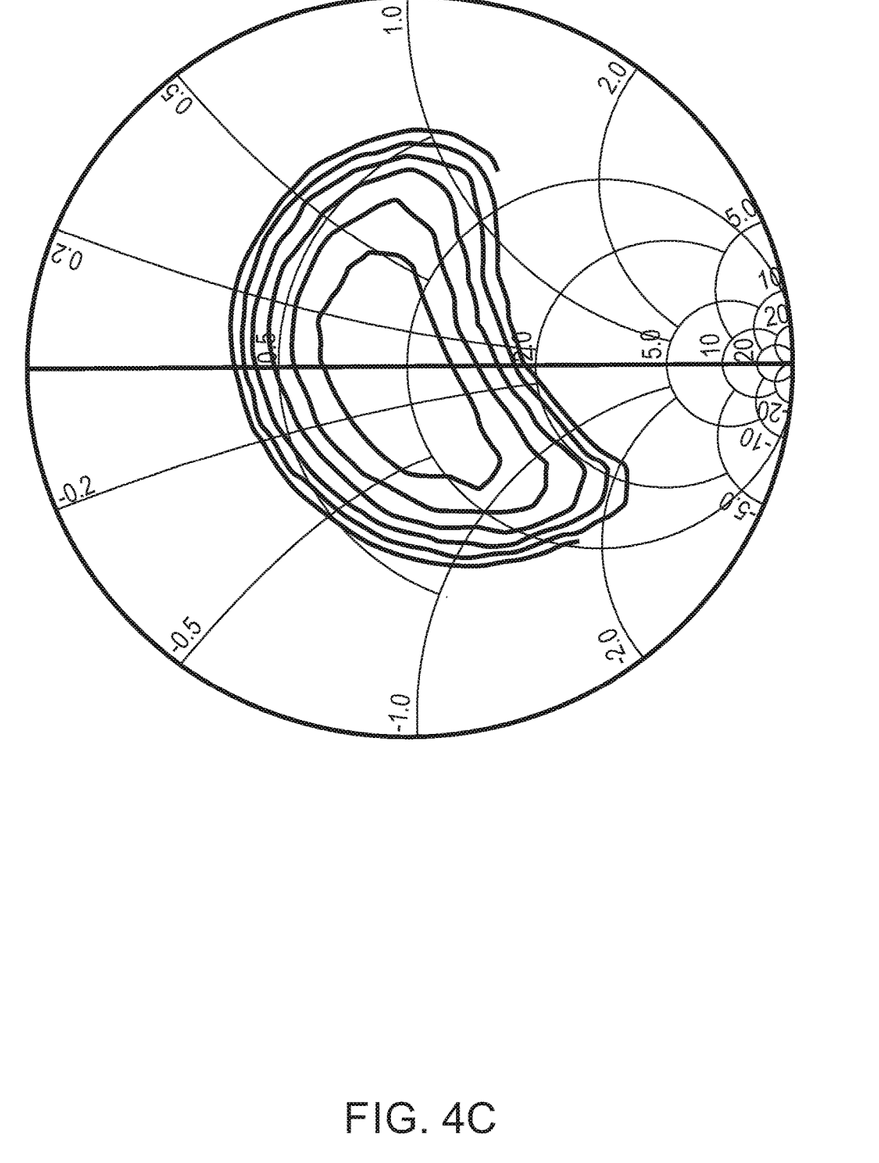
Figure 4D:
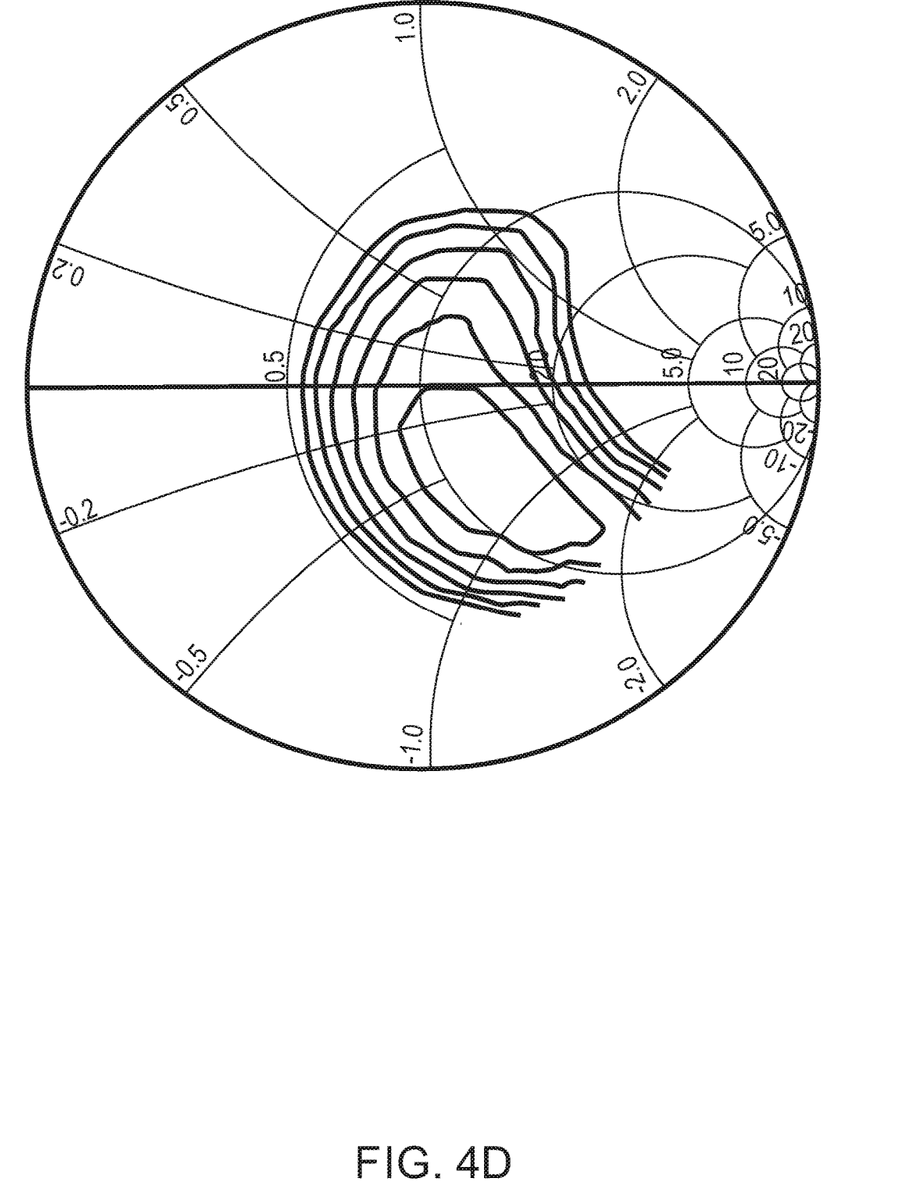

FIG. 3 shows charts of efficiency for current versus phase shift for a wireless charging system. For example, graph 300A shows the relationship between output power, output current, and phase shift between two phase legs 224 of the differential power amplifier 114. In graphs 300A and 300B, phase shift is represented as a deviation from true differential condition i.e. 180 degrees out of phase. Both output power and output current decrease as the phase shift is increased. Due to this relationship, the output power and current may be controlled by phase shifting.

FIG. 3 also includes graph 300B showing the relationship between efficiency, lost power, and phase shift. Graph 300B shows the corresponding efficiency dropping as phase shift increases between legs 224 of the differential power amplifier. Further, as shown in graph 300B, when measured against the same load, the efficiency of the differential power amplifier 114 degrades as the amount of current supplied deviates from the maximum output current.

Additionally, power loss at low current values is due in large part to the excessive current circulating in the ZVS tank circuits 222 during large phase shifts. Advantageously, different reactive load conditions may help compensate for the loss at low currents, and to make the topology more viable for productization. Accordingly, in examples of the claimed subject matter, the differential power amplifier 114 dynamically adjusts the reactive part of the load presented. The reactive part of the load is adjusted based on a table of programmable thresholds for output current in order to maintain a useful power amplifier efficiency over a range of output current levels.

FIGS. 4A-4D are Smith charts 400A-400D showing simulated results of power amplifier efficiency contours for different phase shifts and corresponding output currents. For example, the Smith chart 400A shows simulated results for a 0 nanosecond (ns) delay and 1 Ampere (1 A) output current. Smith charts 400B-D shows simulated results for a 20 ns delay and 850 milliamp output current; a 40 ns delay and 600 milliamp output current; and, a 60 ns delay with corresponding 250 milliamp output current, respectively. On a Smith chart, the region above the X-axis represents inductive loads, and the region below the X-axis represents capacitive loads. Further, the central region of the efficiency contours represent the more efficient locations, as opposed to the efficiency contours surrounding the central regions. As the efficiency contours move away from the central region, the efficiency declines. The simulated results of the charts 400A-400D show that as the phase shift increases (and the output current decreases), the maximum efficiency location for the power amplifier is shifting from an inductive region to a more capacitive region on the Smith chart. Thus, if the PTU system tunes the load to a fixed load reactance, the power amplifier is not able to provide maximum efficiency across different output current levels. Accordingly, examples of the claimed subject matter set different reactance targets for an adaptive tuning circuit based on different output current levels. Simulations of such examples indicate the possibility of an efficiency improvement up to 6% in comparison to fixed adaptive tuning target schemes.

Figure 5:
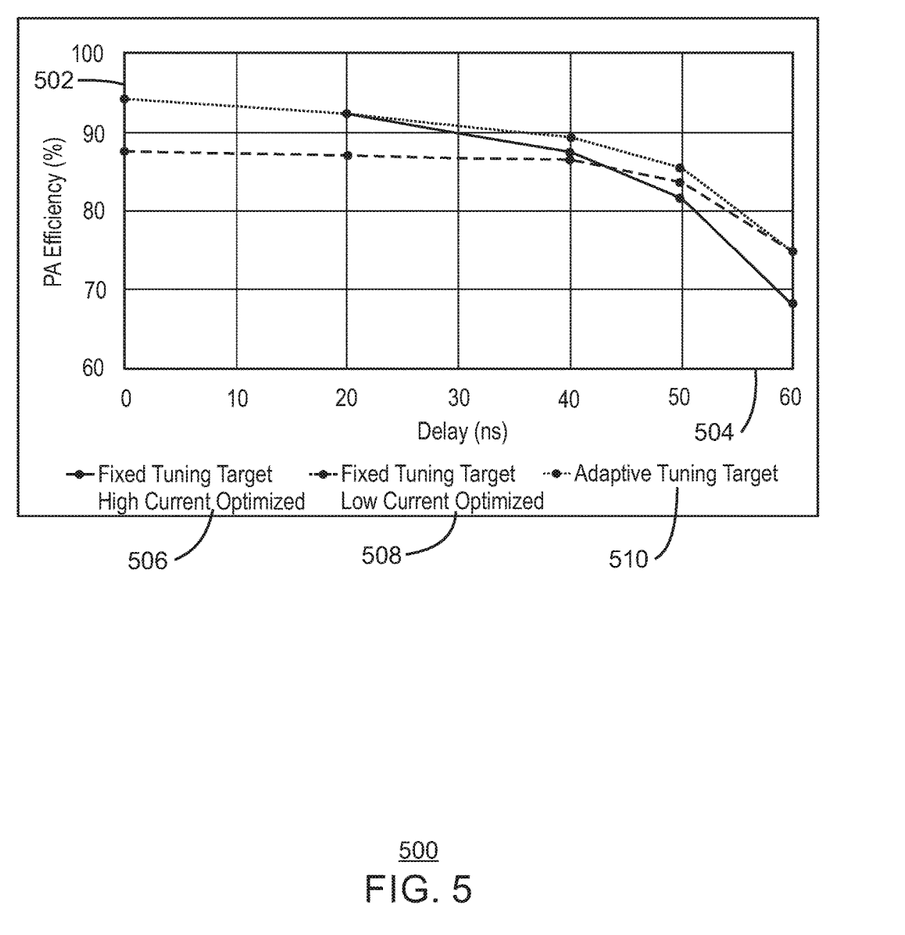
FIG. 5 is a chart of power amplifier efficiency versus delay in an example implementation of adaptive impedance control for wireless charging.

FIG. 5 is a graph 500 showing a comparison of power amplifier efficiency between conventional fixed tuning target solutions, and an adaptive tuning target according to examples of the claimed subject matter. More specifically, the graph 500 shows power amplifier efficiency versus different phase shifts when using a fixed tuning target optimized for high current, a fixed tuning target optimized for low current, and an adaptive tuning target. As shown, the efficiency of the power amplifier is higher across the shown delay range (and hence, the corresponding output current range) when using the adaptive tuning target in comparison to a fixed tuning target, regardless of whether the target is optimized for high or low current.

The differential power amplifier 114 may be implemented in an open loop firmware or software controlled adaptive triggering threshold scheme for different current output levels. An approximate formula or a lookup table may be used to provide the threshold values of reactance for various output currents. Since the differential power amplifier 114 provides constant current output, the change in the target reactance for adaptive tuning does not impact the current power delivered to the coil 228.

Figure 6:
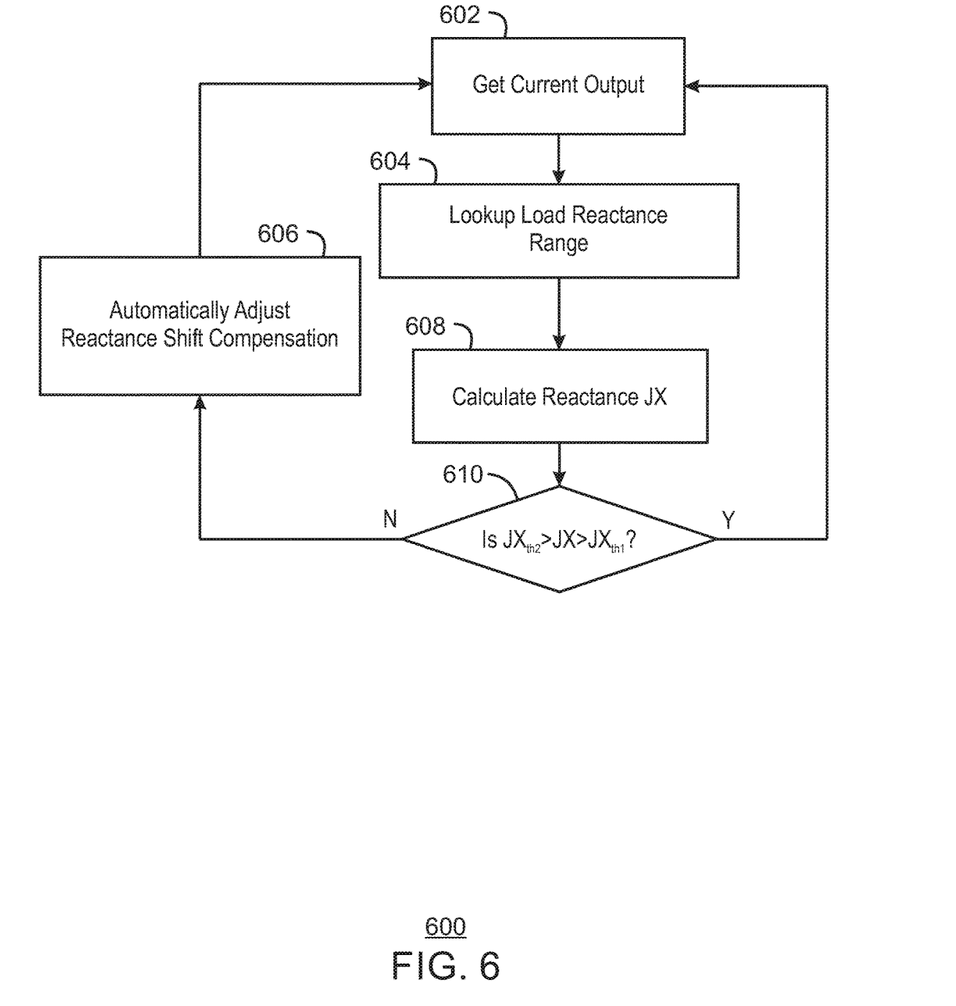
FIG. 6 is a process flow diagram of a method for adaptive impedance control for wireless charging.

FIG. 6 is a process flow diagram of a method 600 for adaptive impedance control in wireless charging. The method begins at block 602, where the differential power amplifier 114 determines its current output level to be input to the transmission coil 226. The determination may occur, for example, in response to a PRU feedback request specified in the A4WP protocol.

At block 604, the PTU (Controller 124) performs a lookup of the load reactance range that maximizes PA efficiency at the current output level. The load reactance range may be represented, for example, as $Jx_{th1}<Jx<Jx_{th2}$, where $Jx_{th1}$ and $Jx_{th2}$ represent the lower and upper bounds, respectively of the load reactance range.

At block 606, PTU (Controller 124) detects load impedance, and calculates reactance, Jx. At block 608, the PTU (Controller 124) determines whether the reactance, Jx, is within the range of efficiency for the current output level. If so, the method 600 repeats from block 602. If not, the PTU (Controller 124) adjusts the reactance shift compensation in order to adjust the reactance, Jx, to within the range of efficiency. This may be done by addressing the auto-tuning capacitors 226.

It is to be understood that the block diagram of FIG. 6 is not intended to indicate that the device 600 is to include all of the components shown in FIG. 6. Rather, the device 600 can include fewer or additional components not illustrated in FIG. 6 (e.g., additional memory components, embedded controllers, additional modules, additional network interfaces, etc.). Furthermore, any of the functionalities of the device 600 may be partially, or entirely, implemented in hardware and/or in the processor 604. For example, the functionality may be implemented with an application specific integrated circuit, logic implemented in an embedded controller, logic implemented in the processor 604, software (e.g., an application, among others), firmware, or any suitable combination of hardware, software, and firmware.

Although examples of the disclosed subject matter are described with reference to block and flow diagrams in FIGS. 1-6, people of ordinary skill in the art readily appreciate that many other methods of implementing the disclosed subject matter may alternatively be used. For example, the order of execution of the blocks in flow diagrams may be changed, and some of the blocks in the diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine-readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

EXAMPLES

Example 1 is an apparatus including a transmission coil and a power amplifier. The power amplifier includes a controller and a memory. The memory includes instructions that cause the controller to determine electric current output of the power amplifier. The controller also performs a lookup of load reactance range based on the electric current output. Additionally, the controller detects load impedance. The controller also calculates reactance based on the load impedance. The controller further determines if reactance is within the load reactance range. Additionally, the controller adjusts reactance shift compensation to bring the reactance within the load reactance range if the reactance is not within the load reactance range.

Example 2 is an apparatus including a transmission coil and a power amplifier. The power amplifier includes a controller and a memory. The memory includes instructions that cause the controller to determine electric current output of the power amplifier. The controller also performs a lookup of load reactance range based on the electric current output. Additionally, the controller detects load impedance. The controller also calculates reactance based on the load impedance. The controller further determines if reactance is within the load reactance range. Additionally, the controller adjusts reactance shift compensation to bring the reactance within the load reactance range if the reactance is not within the load reactance range. In one example, the power amplifier is a differential power amplifier including a first leg having a first capacitor, and a second leg having a second capacitor. Reactance is based on the combined reactance of the coil, the first capacitor and the second capacitor.

Example 3 is an apparatus including a transmission coil and a power amplifier. The power amplifier includes a controller and a memory. The memory includes instructions that cause the controller to determine electric current output of the power amplifier. The controller also performs a lookup of load reactance range based on the electric current output. Additionally, the controller detects load impedance. The controller also calculates reactance based on the load impedance. The controller further determines if reactance is within the load reactance range. Additionally, the controller adjusts reactance shift compensation to bring the reactance within the load reactance range if the reactance is not within the load reactance range. In one example, the instructions cause the controller to perform a lookup of a lookup table. The lookup table includes multiple current levels and corresponding reactance ranges. In one example, the memory includes the lookup table.

Example 4 is an apparatus including a transmission coil and a power amplifier. The power amplifier includes a controller and a memory. The memory includes instructions that cause the controller to determine electric current output of the power amplifier. The controller also performs a lookup of load reactance range based on the electric current output. Additionally, the controller detects load impedance. The controller also calculates reactance based on the load impedance. The controller further determines if reactance is within the load reactance range. Additionally, the controller adjusts reactance shift compensation to bring the reactance within the load reactance range if the reactance is not within the load reactance range. In one example, the instructions cause the controller to perform a lookup of a lookup table. The lookup table includes multiple current levels and corresponding reactance ranges. In one example, the memory includes the lookup table. In an example, the corresponding reactance ranges specify reactance ranges that provide for efficient power amplification at the electric current output.

Example 5 is an apparatus including a transmission coil and a power amplifier. The power amplifier includes a controller and a memory. The memory includes instructions that cause the controller to determine electric current output of the power amplifier. The controller also performs a lookup of load reactance range based on the electric current output. Additionally, the controller detects load impedance. The controller also calculates reactance based on the load impedance. The controller further determines if reactance is within the load reactance range. Additionally, the controller adjusts reactance shift compensation to bring the reactance within the load reactance range if the reactance is not within the load reactance range. In one example, the power amplifier is a differential power amplifier including a first leg having a first capacitor, and a second leg having a second capacitor. Reactance is based on the combined reactance of the coil, the first capacitor and the second capacitor. In one example, the reactance shift compensation is adjusted by adjusting the value of the first capacitor and the second capacitor.

Example 5 is an apparatus including a transmission coil and a power amplifier. The power amplifier includes a controller and a memory. The memory includes instructions that cause the controller to determine electric current output of the power amplifier. The controller also performs a lookup of load reactance range based on the electric current output. Additionally, the controller detects load impedance. The controller also calculates reactance based on the load impedance. The controller further determines if reactance is within the load reactance range. Additionally, the controller adjusts reactance shift compensation to bring the reactance within the load reactance range if the reactance is not within the load reactance range. In one example, the power amplifier is a differential power amplifier including a first leg having a first capacitor, and a second leg having a second capacitor. Reactance is based on the combined reactance of the coil, the first capacitor and the second capacitor. In one example, the reactance shift compensation is adjusted by adjusting the value of the first capacitor and the second capacitor. In an example, the differential power amplifier comprises a class D differential power amplifier.

Example 7 Example 2 is an apparatus including a transmission coil and a power amplifier. The power amplifier includes a controller and a memory. The memory includes instructions that cause the controller to determine electric current output of the power amplifier. The controller also performs a lookup of load reactance range based on the electric current output. Additionally, the controller detects load impedance. The controller also calculates reactance based on the load impedance. The controller further determines if reactance is within the load reactance range. Additionally, the controller adjusts reactance shift compensation to bring the reactance within the load reactance range if the reactance is not within the load reactance range. In one example, the power amplifier is a differential power amplifier including a first leg having a first capacitor, and a second leg having a second capacitor. Reactance is based on the combined reactance of the coil, the first capacitor and the second capacitor. In one example, the differential power amplifier includes adaptive reactance capacitors that provide impedance matching within a specified reactance range for the electric current output.

Example 8 is a system including a differential power amplifier. The differential power amplifier determines electric current output of the differential power amplifier. The differential power amplifier also performs a lookup of load reactance range based on the electric current output. Additionally, the differential power amplifier detects load impedance of a transmission coil associated with the differential power amplifier. Further, the differential power amplifier calculates reactance based on the load impedance. Also, the differential power amplifier determines if reactance is within the load reactance range. The differential power amplifier further adjusts reactance shift compensation to bring the reactance within the load reactance range if the reactance is not within the load reactance range.

Example 9 is a system including a differential power amplifier. The differential power amplifier determines electric current output of the differential power amplifier. The differential power amplifier also performs a lookup of load reactance range based on the electric current output. Additionally, the differential power amplifier detects load impedance of a transmission coil associated with the differential power amplifier. Further, the differential power amplifier calculates reactance based on the load impedance. Also, the differential power amplifier determines if reactance is within the load reactance range. The differential power amplifier further adjusts reactance shift compensation to bring the reactance within the load reactance range if the reactance is not within the load reactance range. In one example, the differential power amplifier includes a first leg having a first capacitor, and a second leg having a second capacitor. In an example, the reactance is based on the combined reactance of the coil, the first capacitor and the second capacitor.

Example 10 is a system including a differential power amplifier. The differential power amplifier determines electric current output of the differential power amplifier. The differential power amplifier also performs a lookup of load reactance range based on the electric current output. Additionally, the differential power amplifier detects load impedance of a transmission coil associated with the differential power amplifier. Further, the differential power amplifier calculates reactance based on the load impedance. Also, the differential power amplifier determines if reactance is within the load reactance range. The differential power amplifier further adjusts reactance shift compensation to bring the reactance within the load reactance range if the reactance is not within the load reactance range. In one example, the differential power amplifier performs a lookup of a lookup table having a multiple current levels and corresponding reactance ranges. In an example, the memory includes the lookup table.

Example 11 is a system including a differential power amplifier. The differential power amplifier determines electric current output of the differential power amplifier. The differential power amplifier also performs a lookup of load reactance range based on the electric current output. Additionally, the differential power amplifier detects load impedance of a transmission coil associated with the differential power amplifier. Further, the differential power amplifier calculates reactance based on the load impedance. Also, the differential power amplifier determines if reactance is within the load reactance range. The differential power amplifier further adjusts reactance shift compensation to bring the reactance within the load reactance range if the reactance is not within the load reactance range. In one example, the reactance shift compensation is adjusted by adjusting the value of the first capacitor and the second capacitor.

Example 12 is a system including a differential power amplifier. The differential power amplifier determines electric current output of the differential power amplifier. The differential power amplifier also performs a lookup of load reactance range based on the electric current output. Additionally, the differential power amplifier detects load impedance of a transmission coil associated with the differential power amplifier. Further, the differential power amplifier calculates reactance based on the load impedance. Also, the differential power amplifier determines if reactance is within the load reactance range. The differential power amplifier further adjusts reactance shift compensation to bring the reactance within the load reactance range if the reactance is not within the load reactance range. In one example, the reactance shift compensation is adjusted by adjusting the value of the first capacitor and the second capacitor. In an example, the differential power amplifier includes a class D differential power amplifier.

Example 13 is a method for adaptive impedance control in wireless charging. The method includes determining an electric current output of a power amplifier. The method also includes performing a lookup of load reactance range based on target electric current. Additionally, the method includes detecting load impedance. Further, the method includes calculating reactance based on the load impedance. Also, the method includes determining if reactance is within the load reactance range. The method additionally includes adjusting reactance shift compensation to bring the reactance within the load reactance range if the reactance is not within the load reactance range.

Example 14 is a method for adaptive impedance control in wireless charging. The method includes determining an electric current output of a power amplifier. The method also includes performing a lookup of load reactance range based on target electric current. Additionally, the method includes detecting load impedance. Further, the method includes calculating reactance based on the load impedance. Also, the method includes determining if reactance is within the load reactance range. The method additionally includes adjusting reactance shift compensation to bring the reactance within the load reactance range if the reactance is not within the load reactance range. In one example, the differential power amplifier includes a first leg having a first capacitor, and a second leg having a second capacitor. In one example, wherein a reactance is based on the combined reactance of the coil, the first capacitor and the second capacitor.

Example 15 is a method for adaptive impedance control in wireless charging. The method includes determining an electric current output of a power amplifier. The method also includes performing a lookup of load reactance range based on target electric current. Additionally, the method includes detecting load impedance. Further, the method includes calculating reactance based on the load impedance. Also, the method includes determining if reactance is within the load reactance range. The method additionally includes adjusting reactance shift compensation to bring the reactance within the load reactance range if the reactance is not within the load reactance range. In one example, the method further includes performing a lookup of a lookup table having a multiple current levels and corresponding reactance ranges. In an example, the memory includes the lookup table.

Example 16 is a method for adaptive impedance control in wireless charging. The method includes determining an electric current output of a power amplifier. The method also includes performing a lookup of load reactance range based on target electric current. Additionally, the method includes detecting load impedance. Further, the method includes calculating reactance based on the load impedance. Also, the method includes determining if reactance is within the load reactance range. The method additionally includes adjusting reactance shift compensation to bring the reactance within the load reactance range if the reactance is not within the load reactance range. In one example, the method further includes performing a lookup of a lookup table having a multiple current levels and corresponding reactance ranges. In an example, the memory includes the lookup table. In one example, the reactance shift compensation is adjusted by adjusting the value of the first capacitor and the second capacitor.

Example 17 is a method for adaptive impedance control in wireless charging. The method includes determining an electric current output of a power amplifier. The method also includes performing a lookup of load reactance range based on target electric current. Additionally, the method includes detecting load impedance. Further, the method includes calculating reactance based on the load impedance. Also, the method includes determining if reactance is within the load reactance range. The method additionally includes adjusting reactance shift compensation to bring the reactance within the load reactance range if the reactance is not within the load reactance range. In one example, the method further includes performing a lookup of a lookup table having a multiple current levels and corresponding reactance ranges. In an example, the memory includes the lookup table. In one example, the reactance shift compensation is adjusted by adjusting the value of the first capacitor and the second capacitor. In one example, the differential power amplifier includes a class D differential power amplifier.

Example 18 is a non-transitory computer-readable medium for adaptive impedance control in wireless charging. The medium includes instructions that cause a processor to determine electric current output of a differential power amplifier. The instructions also cause the processor to perform a lookup of load reactance range based on target electric current. Additionally, the instructions cause the processor to detect load impedance of a transmission coil associated with the differential power amplifier. Also, the differential power amplifier includes a first leg having a first capacitor, and a second leg having a second capacitor. Further, the instructions cause the processor to calculate reactance based on the load impedance. Also, the instructions cause the processor to determine if reactance is within the load reactance range. The instructions further cause the processor to adjust reactance shift compensation to bring the reactance within the load reactance range if the reactance is not within the load reactance range. Further, the differential power amplifier includes a first leg having a first capacitor, and a second leg having a second capacitor. The reactance is based on the combined reactance of the coil, the first capacitor and the second capacitor.

Example 19 is a non-transitory computer-readable medium for adaptive impedance control in wireless charging. The medium includes instructions that cause a processor to determine electric current output of a differential power amplifier. The instructions also cause the processor to perform a lookup of load reactance range based on target electric current. Additionally, the instructions cause the processor to detect load impedance of a transmission coil associated with the differential power amplifier. Also, the differential power amplifier includes a first leg having a first capacitor, and a second leg having a second capacitor. Further, the instructions cause the processor to calculate reactance based on the load impedance. Also, the instructions cause the processor to determine if reactance is within the load reactance range. The instructions further cause the processor to adjust reactance shift compensation to bring the reactance within the load reactance range if the reactance is not within the load reactance range. Further, the differential power amplifier includes a first leg having a first capacitor, and a second leg having a second capacitor. The reactance is based on the combined reactance of the coil, the first capacitor and the second capacitor. In one example, the memory comprises a lookup table having multiple current levels and corresponding reactance ranges.

Example 20 is a non-transitory computer-readable medium for adaptive impedance control in wireless charging. The medium includes instructions that cause a processor to determine electric current output of a differential power amplifier. The instructions also cause the processor to perform a lookup of load reactance range based on target electric current. Additionally, the instructions cause the processor to detect load impedance of a transmission coil associated with the differential power amplifier. Also, the differential power amplifier includes a first leg having a first capacitor, and a second leg having a second capacitor. Further, the instructions cause the processor to calculate reactance based on the load impedance. Also, the instructions cause the processor to determine if reactance is within the load reactance range. The instructions further cause the processor to adjust reactance shift compensation to bring the reactance within the load reactance range if the reactance is not within the load reactance range. Further, the differential power amplifier includes a first leg having a first capacitor, and a second leg having a second capacitor. The reactance is based on the combined reactance of the coil, the first capacitor and the second capacitor. In one example, the memory comprises a lookup table having multiple current levels and corresponding reactance ranges. In one example, the reactance shift compensation is adjusted by adjusting the value of the first capacitor and the second capacitor.

Example 21 is a non-transitory computer-readable medium for adaptive impedance control in wireless charging. The medium includes instructions that cause a processor to determine electric current output of a differential power amplifier. The instructions also cause the processor to perform a lookup of load reactance range based on target electric current. Additionally, the instructions cause the processor to detect load impedance of a transmission coil associated with the differential power amplifier. Also, the differential power amplifier includes a first leg having a first capacitor, and a second leg having a second capacitor. Further, the instructions cause the processor to calculate reactance based on the load impedance. Also, the instructions cause the processor to determine if reactance is within the load reactance range. The instructions further cause the processor to adjust reactance shift compensation to bring the reactance within the load reactance range if the reactance is not within the load reactance range. Further, the differential power amplifier includes a first leg having a first capacitor, and a second leg having a second capacitor. The reactance is based on the combined reactance of the coil, the first capacitor and the second capacitor. In one example, the memory comprises a lookup table having multiple current levels and corresponding reactance ranges. In one example, the reactance shift compensation is adjusted by adjusting the value of the first capacitor and the second capacitor.

Not all components, features, structures, characteristics, etc., described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus comprising:
   a transmission coil; and
   a power amplifier comprising:
   a controller; and
   a memory, comprising instructions to cause the controller to:
   determine electric current output of the power amplifier;
   perform a lookup of load reactance range based on the electric current output;
   detect load impedance of the transmission coil;
   calculate reactance based on the load impedance;
   determine if reactance is within the load reactance range; and
   adjust reactance shift compensation to obtain a reactance that is within the load reactance range if the reactance is not within the load reactance range.

2. The apparatus of claim 1, wherein the power amplifier comprises a differential power amplifier comprising:
   a first leg comprising a first capacitor; and a second leg comprising a second capacitor, wherein the reactance is based on a combined reactance of the transmission coil, the first capacitor, and the second capacitor.

3. The apparatus of claim 1, wherein the instructions cause the controller to perform a lookup of a lookup table comprising a plurality of current levels and a corresponding plurality of reactance ranges, wherein the lookup table is stored within the memory.

4. The apparatus of claim 3, wherein the corresponding plurality of reactance ranges specify reactance ranges that provide for efficient power amplification at the electric current output.

5. The apparatus of claim 2, wherein the reactance shift compensation is adjusted by adjusting a value of the first capacitor and the second capacitor.

6. The apparatus of claim 5, wherein the differential power amplifier comprises a class D differential power amplifier.

7. The apparatus of claim 2, wherein the differential power amplifier comprises adaptive reactance capacitors that provide impedance matching within a specified reactance range for the electric current output.

8. A system comprising:
a differential power amplifier to:
determine electric current output of the differential power amplifier;
perform a lookup of load reactance range based on the electric current output;
detect load impedance of a transmission coil associated with the differential power amplifier;
calculate reactance based on the load impedance;
determine if reactance is within the load reactance range; and
adjust reactance shift compensation to bring the reactance within the load reactance range if the reactance is not within the load reactance range.

9. The system of claim 8, wherein the differential power amplifier comprises:
a first leg comprising a first capacitor; and
a second leg comprising a second capacitor, wherein a reactance is based on a combined reactance of the transmission coil, the first capacitor and the second capacitor.

10. The system of claim 8, the differential power amplifier to perform a lookup of a lookup table comprising a plurality of current levels and a corresponding plurality of reactance ranges, wherein the memory comprises the lookup table.

11. The system of claim 8, wherein the reactance shift compensation is adjusted by adjusting a value of the first capacitor and the second capacitor.

12. The system of claim 11, the differential power amplifier comprising a class D differential power amplifier.

13. A method for adaptive impedance control for wireless charging, the method comprising:
determining electric current output of a power amplifier;
performing a lookup of load reactance range based on target electric current;
detecting load impedance of a transmitting coil associated with the power amplifier;
calculating reactance based on the load impedance;
determining if reactance is within the load reactance range; and
adjusting reactance shift compensation to bring the reactance within the load reactance range if the reactance is not within the load reactance range.

14. The method of claim 13, wherein the power amplifier comprises a differential power amplifier comprising:
a first leg comprising a first capacitor; and
a second leg comprising a second capacitor, wherein a reactance is based on a combined reactance of the transmitting coil, the first capacitor and the second capacitor.

15. The method of claim 13, comprising performing a lookup of a lookup table comprising a plurality of current levels and a corresponding plurality of reactance ranges, wherein the memory comprises the lookup table.

16. The method of claim 15, wherein the reactance shift compensation is adjusted by adjusting a value of the first capacitor and the second capacitor.

17. The method of claim 14, wherein the differential power amplifier comprises a class D differential power amplifier.

18. A non-transitory computer-readable medium for adaptive impedance control in wireless charging, the medium comprising instructions that cause a processor to:
determine electric current output of a differential power amplifier;
perform a lookup of load reactance range based on target electric current;
detect load impedance of a transmission coil associated with the differential power amplifier;
calculate reactance based on the load impedance;
determine if reactance is within the load reactance range; and
adjust reactance shift compensation to bring the reactance within the load reactance range if the reactance is not within the load reactance range, wherein the differential power amplifier comprises:
a first leg comprising a first capacitor; and
a second leg comprising a second capacitor, wherein a reactance is based on a combined reactance of the transmitting coil, the first capacitor and the second capacitor.

19. The medium of claim 18, wherein the memory comprises a lookup table comprising a plurality of current levels and a corresponding plurality of reactance ranges.

20. The medium of claim 19, wherein the reactance shift compensation is adjusted by adjusting a value of the first capacitor and the second capacitor.

21. The medium of claim 20, wherein the differential power amplifier comprises a class D differential power amplifier.

* * * * *